United States Patent [19]
Kiger et al.

[11] 3,802,893
[45] Apr. 9, 1974

[54] POLYCRYSTALLINE ABRASION-RESISTANT ALUMINA COMPOSITIONS

[75] Inventors: W. Terry Kiger, Athens, Pa.; William E. Blodgett, deceased, late of Towanda, Pa. by Elizabeth K. Blodgett, executrix

[73] Assignee: GTE Sylvania Incorporated, Seneck Falls, N.Y.

[22] Filed: Aug. 28, 1972

[21] Appl. No.: 284,036

[52] U.S. Cl.................... 106/62, 106/65, 106/73.4, 51/309
[51] Int. Cl............................................. C04b 35/10
[58] Field of Search................ 106/62, 65, 46, 73.4; 51/309

[56] References Cited
UNITED STATES PATENTS

| | | | |
|---|---|---|---|
| 3,377,176 | 4/1968 | Wolkodoff et al. | 106/65 |
| 3,026,210 | 3/1962 | Coble | 106/62 |
| 3,026,177 | 3/1962 | St. Pierre et al. | 106/65 |
| 3,311,482 | 3/1967 | Klingler et al. | 106/46 |
| 3,711,585 | 1/1973 | Muta et al. | 106/65 |

*Primary Examiner*—James E. Poer
*Attorney, Agent, or Firm*—Norman J. O'Malley; Donald R. Castle; William H. McNeill

[57] ABSTRACT

A polycrystalline abrasion-resistant alumina composition consists essentially of from about 99.5% to about 99.9% by weight of aluminum oxide, from about 0.01% to about 0.25% by weight of magnesium oxide and from about 0.01% to about 0.25% by weight of samarium oxide is disclosed. The composition has an average grain size of from about 2 to 5 microns and a relatively uniform distribution of grain size. The improved composition is prepared by an improved process that enables the small uniform grain size to be achieved at firing temperatures of above about 1,500° C and eliminates the need for a hot pressing step.

9 Claims, No Drawings

POLYCRYSTALLINE ABRASION-RESISTANT ALUMINA COMPOSITIONS

BACKGROUND OF THE INVENTION

1. Field of the Invention

This invention relates to polycrystalline alumina compositions. More particularly, it relates to polycrystalline alumina compositions having a uniform fine-grain structure which contributes to the strength, toughness and durability of the composition when formed into articles capable of being polished to obtain an extremely smooth surface for uses where abrasion resistance is of primary importance such as cutting tool inserts.

2. Prior Art

Polycrystalline alumina ceramics refers generically to ceramic material generally containing greater than 99 percent aluminum oxide along with certain additives. While compositions chemically can have essentially the same ingredients, the properties including the grain structure, appearance, mechanical properties and the like can vary greatly depending upon numerous factors. The additives while present in very small amounts such as as little as 500 ppm or less can drastically effect the properties which are of major importance in some uses. For example, some polycrystalline alumina compositions are used in areas where a transparent material capable of withstanding high temperatures without chemical or physical deterioration is required. Typical uses are viewing windows in furnaces and reactors, tubes for arc-discharge lamps and the like. Typical of these are the materials disclosed in U.S. Pat. No. 3,026,210. It is believed apparent that the properties of transparency and heat resistance are of primary importance while abrasion resistance and external surface characteristics of smoothness are not of primary importance. Other alumina compositions are used in areas where transparency and heat resistance are of secondary importance; however, abrasion resistance and strength are key properties. A typical example is in cutting tools inserts. U.S. Pat. No. 3,377,176 discloses use of various oxides as grain-growth inhibitors. Particularly preferred is a combination of yttrium oxide and magnesium oxide. No alumina compositions, however, are believed to possess all of the qualities desired for all uses. Generally, either the additives used or the firing temperature will create a form of alumina composition that is unsuitable for one of the uses; however, it can be satisfactory for other uses. It is believed the primary reason for the different types of alumina is in the grain structure. The firing temperatures generally required to achieve the transparency required in translucent alumina generally creates grain sizes too large for abrasion-resistant alumina. When the alumina ceramics are used for abrasion purposes such as cutting tool inserts, the compositions have to have a smooth exterior surface as well as being abrasion-resistant. The grain size of the alumina and uniformity thereof are important properties in achieving these characteristics. Another important property is the density which is a measure of the degree of voids found in the composition. The freedom from voids improves the durability of the cutting tool inserts because the tendency to chip is reduced and the abrasion resistance increased. While higher firing temperatures in general will yield alumina compositions of higher density than those produced at lower temperatures, both the uniformity and size of the grain structure is detrimentally effected. While some additives have been used, such as magnesium oxide, to inhibit grain growth and the average size can be diminished to a considerable degree from the average size that is attained without the additives, the uniformity or size distributions has not heretofore been effectively controlled particularly when the higher firing temperatures are used. It is believed, therefore, that polycrystalline alumina ceramic having a fine grain structure which is uniform and is highly resistant to wear and chipping and capable of being polished to a high degree of smoothness would be an advancement in the art. It is also believed that a process which enables firing temperatures higher than those previously used for the formation of a polycrystalline alumina ceramic suitable for cutting tool uses where transparency is of little importance and which has a uniform fine grain structure and is relatively free of voids is an advancement in the art.

OBJECTS AND SUMMARY OF THE INVENTION

It is an object of this invention to provide an improved polycrystalline abrasion-resistant alumina ceramic.

It is a further object of this invention to provide a polycrystalline abrasion-resistant ceramic that, when used in cutting tools, yields improved tool life.

It is an additional object of this invention to provide a polycrystalline abrasion-resistant ceramic that has a small and uniform grain size.

It is still another object of this invention to provide a process which produces a polycrystalline alumina ceramic having a small and uniform grain size which uses firing temperatures of from above about 1,500° C and does not require a hot pressing step.

These and other objects are achieved in one aspect of the invention by a composition consisting essentially of from about 99.5% to about 99.9% alumina oxide, from about 0.01% to about 0.25% magnesium oxide and from about 0.01% to about 0.25% samarium oxide. The composition has an average grain size of about 3 microns and having at least about 99percent of the grains within the size range of from 2 to 5 microns. Additionally, another embodiment of this invention is a process for producing a polycrystalline alumina ceramic which process comprises blending in a noncontaminating medium from about 99.5% to about 99.9% by weight of aluminum oxide, from about 0.01% to about 0.25% of magnesium oxide, from about 0.01% to about 0.25% by weight of samarium oxide and at least about 2 parts per part of the oxide of an aqueous solution of a binder-lubricant system for a time period of at least about 16 hours, drying and screening the mixture to form a free-flowing powder having a particle size smaller than the openings in a U.S. Standard 45-mesh screen, cold pressing the powder to form a shaped article, presintering the shaped article to remove the organics from the article and firing in a hydrogen atmosphere at a temperature of above about 1,500° C for about 5 hours.

DETAILS OF THE PREFERRED EMBODIMENTS

For a better understanding of the present invention, together with other and further objects, advantages, and capabilities thereof, reference is made to the following disclosure and appended claims in connection with the above description of some of the aspects of the invention.

The raw materials must be of relatively high purity because of the adverse effect of impurities upon the properties of the finished ceramic. The purity of the aluminum, magnesium and samarium oxides should be at least 99.98% and preferably at least 99.99% to insure a high-quality product. The amount of magnesium oxide and samarium oxide are kept in the 0.01% by weight to 0.25% by weight range because less of these oxides do not produce the grain-growth inhibition and larger amounts adversely effect the hardness and abrasion resistance. About 0.05% to about 0.20% of each of magnesium and samarium oxide is preferred.

The high-purity raw materials of the foregoing metal oxides are blended in proper proportions in a contaminant-free system. The equipment used is preferably lined with rubber, plastic, and the like or is constructed of a material which will not be either eroded or corroded to yield a source of contamination and, thus, will not add small amounts of metal ions to the system. In any event, the equipment and the grinding medium must not be a source of contamination. The grinding medium is preferably high-purity alumina balls having essentially the same composition as the raw material so that upon wear in the ball mill, no contaminating metal oxide or other contaminant is added. The milling and blending of the foregoing solid metal oxide is generally carried out in an aqueous system containing de-ionized water, an organic binder and lubricant. In the present process about ¾ to about 2 parts by weight of aqueous solution containing from about 0.5% to about 1% by weight of an organic binder and from about 1.0% to 3.0% of a lubricant are added per part of solid. Blending is conducted for about 16 hours. The organic binders which can be used are those which are water-soluble at least to the extent of about 5% by weight, upon drying at about 110° C form cakes, and upon being heated to above about 500° C decompose without leaving any appreciable amount of residue or ash. Suitable materials for the binders include dextrin, glycerin, the relatively long chain polyhydric alcohols such as PVA and the like. While saturated alcohols such as polyethylene glycol are preferred as lubricants, any organic which is water soluble and forms a film which aids in the blending operation and retards further reduction of particle size can be used. Additionally, the film which is formed after the water is evaporated must give a relatively high green density that is about 30 percent of theoretical. The lubricant must also decompose at about 500° C without forming an appreciable amount of ash or residue.

After the blending is completed, the resulting material is dried in air at a temperature of from about 105° C to about 150° C or sprayed dried to form a free-flowing powder. The dried powder is screened and the powder passing through a 45-mesh screen is hydraulically pressed to form a green part having a desired shape and a bulk density of at least about 45 percent of theoretical density. The green part is thereafter heated or presintered in air to remove the organics. The part is thereafter fired in a reducing atmosphere, preferably hydrogen, at a temperature above about 1,500° C and preferably less than 1,600° C, a grain size of alumina of from 2 to 5 microns is achieved. The density of the polycrystalline alumina is at least 3.90 grams/cm$^3$ and is preferably from about 3.93 to about 3.97 g/cm$^3$. The polycrystalline alumina part is polished to an external surface finish of 2 to 3 rms and is optically flat. The polished part thereafter is machined to its final desired shape. Typical hardness of the fired ceramic is from 91.5 to 94.5 on the Rockwell A scale and is generally from about 92 to 94.

An essential additive is samarium oxide. Other rare-earth oxides such as gadolinium, europium, ytterbium and yttrium oxide do not enable a firing temperature of 1,500° C to be used; fine grain structure and uniformity are not achieved at 1,500° C. Although U.S. Pat. No. 3,377,176 mentioned numerous oxides as grain-growth inhibitors, it is believed surprising that samarium oxide achieved an improvement over those materials considered by the prior art to be equivalent. The polycrystalline ceramic of this invention has a grain size of about 2 to 5 microns while comparable materials of the prior art and other additives previously described in the art as grain-growth inhibitors have a grain size of from about 2 to 10 microns when a density of about 3.90 grams/cm$^3$ is achieved. Small grain size with a narrower size range can be obtained using the prior art additives; however, the density is adversely affected along with the strength and hardness.

To further illustrate the subject invention, the following detailed examples are presented. All parts, proportions and percentages are by weight unless otherwise indicated.

EXAMPLE I

About 1,200 parts of 99.98% pure agglomerate-free alumina, about 0.6 part of 99.99% pure samarium oxide and about 0.6 part of pure magnesium oxide are weighted and placed in a high purity alumina jar mill containing a high purity alumina grinding medium. To this mixture about 2,400 parts of water solution containing 0.5% by weight of polyvinyl alcohol and 2.0% by weight of polyethylene glycol are added. The mixture is then milled for about 16 hours. After milling, the solution is dried at about 110° C for at least about 24 hours. The dried cake is broken up and passed through a U.S. Standard 45-mesh screen. The resulting powder is pressed into a desired shape at 25,000 psi using a hydraulic press. The pressed parts are then air sintered at about 500° C to remove the organic binders and lubricant. The final sintering is carried in hydrogen at about 1,550° C for about 5 hours. The resulting parts have a density of about 3.96 gm/cc with an average grain size of about 3 microns. The grains range in size from 2 to 5 microns. The parts exhibit a hardness of 94 on the Rockwell A scale. The parts are finished by diamond lapping to a surface finish of about 2-3 rms and a flatness of 1 light band.

Substantially similar results are achieved when the magnesium oxide and samarium oxide content is varied throughout the range of from 0.01% to 0.25% by weight.

The materials when used as cutting tool inserts on finishing brake drums exhibit wear characteristics exceeding those of other alumina ceramic inserts that do not contain samarium oxide as an additive. About 50 percent more drums were finished using the ceramic of this example.

In other alumina ceramics in which other rare earth materials such as yttrium oxide, ytterbium oxide, gadolinium oxide, and europium oxide are substituted for samarium oxide in the foregoing example, however, at the firing temperatures used, excessive grain growth occurred.

While there has been shown and described what are at present considered the preferred embodiments of the invention, it will be obvious to those skilled in the art that various changes and modifications may be made therein without departing from the scope of the invention as defined by the appended claims.

What is claimed is:

1. An abrasion-resistant polycrystalline ceramic consisting essentially of about 99.5% to about 99.9% by weight of aluminum oxide, about 0.01% to about 0.25% by weight of magnesium oxide and about 0.01% to about 0.25% by weight of samarium oxide; a grain size of from about 2 to about 5 microns, a density of at least 3.90 grams/cm$^3$.

2. A ceramic composition according to claim 1 wherein said density is from about 3.93 to about 3.97.

3. A composition according to claim 1 wherein said magnesium oxide and said samarium oxide are each from about 0.05% to about 0.20%.

4. A ceramic composition according to claim 1 wherein the Rockwell A hardness is at least 91.5.

5. A ceramic composition according to claim 4 wherein said hardness is from about 92 to about 94.

6. A process for producing an abrasion-resistant ceramic composition comprising:
   a. blending in a non-contaminating mill for at least about 16 hours from about 99.5% to about 99.9% by weight of aluminum oxide, from about 0.01% to about 0.25% by weight of magnesium oxide, from about 0.01% to about 0.25% by weight of samarium oxide, said oxides having a purity of at least 99.98%, and from about ¾ to about 2 parts per part by weight of said oxide of an aqueous solution of an organic binder-lubricant system;
   b. removing the water from the resulting mixture;
   c. screening the resulting dried powder to obtain powder particles having a size less than the openings in a U.S. Standard 45-mesh screen;
   d. cold pressing the resulting powder to form a shaped article;
   e. heating said article to remove said binder and said lubricant; and
   f. firing said article at a temperature of from above 1,500° C.

7. A process according to claim 6 wherein said binder is from about 0.5% to about 1% by weight of said aqueous solution.

8. A process according to claim 6 wherein said lubricant is from about 1.0% to about 3.0% by weight of said aqueous solution.

9. A process according to claim 6 wherein said organic binder is from about 0.5% to about 1% by weight of polyvinyl alcohol and said lubricant is polyethylene glycol.

* * * * *